US010623558B2

(12) United States Patent
Bouvet et al.

(10) Patent No.: US 10,623,558 B2
(45) Date of Patent: Apr. 14, 2020

(54) METHOD AND DEVICE FOR ENRICHING COMMUNICATION SIGNALING (71) Applicant: Orange, Paris (FR)

(72) Inventors: Bertrand Bouvet, Perros Guirec (FR); François Toutain, Lannion (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/308,391

(22) PCT Filed: Jun. 7, 2017

(86) PCT No.: PCT/FR2017/051434
§ 371 (c)(1),
(2) Date: Dec. 7, 2018

(87) PCT Pub. No.: WO2017/212172
PCT Pub. Date: Dec. 14, 2017

(65) Prior Publication Data
US 2019/0199853 A1 Jun. 27, 2019

(30) Foreign Application Priority Data
Jun. 8, 2016 (FR) ...................... 16 55246

(51) Int. Cl.
*H04M 3/22* (2006.01)
*H04M 3/42* (2006.01)
(Continued)

(52) U.S. Cl.
CPC ...... *H04M 3/2281* (2013.01); *H04L 65/1006* (2013.01); *H04L 65/1073* (2013.01);
(Continued)

(58) Field of Classification Search
CPC ........ H04M 3/2281; H04M 2203/6027; H04L 65/1006
(Continued)

(56) References Cited

U.S. PATENT DOCUMENTS

2003/0217165 A1  11/2003 Buch et al.
2006/0120345 A1   6/2006 Sung et al.
(Continued)

FOREIGN PATENT DOCUMENTS

WO   WO 2006/020975 A2   2/2006

OTHER PUBLICATIONS

International Search Report and Written Opinion dated Aug. 9, 2018 for Application no. PCT/FR2017/051434.
(Continued)

*Primary Examiner* — Nghi H Ly
(74) *Attorney, Agent, or Firm* — Knobbe, Martens, Olson & Bear, LLP (57) ABSTRACT A method is described for enhancing, by a device of a first telecommunications network, a communication signal transmitted by a first user of the first network intended for a second user of a second network. The method includes verifying, using a certified identifier of the first user determined by the first network, whether the first user belongs to a predetermined or given category of users. Upon determining that the first user belongs to the given category of users piece of certification information is inserted, for the attention of the second user in a field of the communication signal controlled by the first network, the certification information indicating that the first user belongs to the given category of users. The communication signal is then transferred to the second network.

14 Claims, 3 Drawing Sheets (51) Int. Cl.
H04M 3/436 (2006.01)
H01L 29/06 (2006.01)
H04L 29/06 (2006.01)

(52) U.S. Cl.
CPC ....... H04M 3/42059 (2013.01); H04M 3/436 (2013.01); *H04M 2203/6027* (2013.01); *H04M 2203/6045* (2013.01)

(58) Field of Classification Search
USPC .................. 455/410, 411, 414.1, 418, 432.3
See application file for complete search history.

(56) References Cited

U.S. PATENT DOCUMENTS

| | | |
|---|---|---|
| 2008/0181379 A1 | 7/2008 | Chow et al. |
| 2008/0181380 A1 | 7/2008 | Gustave et al. |
| 2009/0093290 A1* | 4/2009 | Lutnick ................... G07F 17/32 463/16 |
| 2013/0267261 A1* | 10/2013 | Nikkelen .............. H04W 68/00 455/458 |
| 2016/0165453 A1* | 6/2016 | Picker ................... H04W 88/08 455/452.1 |
| 2017/0318450 A1* | 11/2017 | Salkintzis ............ H04W 12/06 |

OTHER PUBLICATIONS

Jennings, et al., "Private Extensions to the Session Initiation Protocol (SIP) for Asserted Identity within Trusted Networks, RFC 3325", Network Working Group RFC 1717, Internet Society, 2002, XP015009093.

* cited by examiner

METHOD AND DEVICE FOR ENRICHING COMMUNICATION SIGNALING

RELATED APPLICATIONS

This application is the U.S. National Phase of Application No. PCT/FR2017/051434 entitled "METHOD FOR ENHANCING A COMMUNICATION SIGNAL AND DEVICE" and filed Jun. 7, 2017, which claims the benefit of French Patent Application No. 1655246, filed Jun. 8, 2016, each of which is incorporated by reference in its entirety.

BACKGROUND OF THE INVENTION

The invention relates to the general field of telecommunications.

It relates more particularly to a solution that makes it easy for a called user to filter communications addressed to that user, and in particular to filter undesirable communications.

The present invention has a preferred, but non-limiting, application in the context of communications sent to users by call centers (e.g. after-sales service centers, call centers undertaking commercial campaigns targeting users, etc.).

Such call centers can be called by users themselves, e.g. in the event of problems involving equipment or services to which the users have subscribed. By way of example, a user may call a call center of a telecommunications operator in order to complain about a malfunction of a telephone installation. If the problem can be solved simply, it might be corrected directly during the call; otherwise, the call center may need to call the user back the same day or in a few days.

Call centers can also contact users at their own initiative, e.g. in order to promote or sell new products or services, or to propose commercial rendezvous, etc. In a "generic" call center that makes calls on behalf of third parties (e.g. a bank), regulations in France require that the number displayed on the terminal of the called user is a number that makes it possible to reach the third party (in the above example the bank) on whose behalf the call center is calling the user.

In the two situations described above, the called user has no guarantee nor "technical" means for verifying that the person contacting the user on behalf of the call center is indeed a representative of that call center.

Specifically, the calling number displayed on the terminal of the called user is a number that is not certified and that can easily be usurped. An identifier is said to be certified when that identifier is established and guaranteed by a trusted entity (e.g. the network operator or some other trusted authority). The calling number is inserted by the caller's terminal or more generally telecommunications equipment (e.g. a private automatic branch exchange (PABX)) at the calling end, and it is conveyed in transparent manner in a call signaling field from end to end by the network(s) through which the call passes between the caller and the called party. For example, with networks implementing session initiation protocol (SIP), the non-certified identifier is conveyed in the SIP FROM field of the SIP INVITE message. The call signaling does indeed convey a certified identity as added by the caller's network (in the example of the SIP protocol, this certified identity is to be found in the SIP P-Asserted-Id field of the INVITE message), however the certified identity is not displayed on the terminal of the called user. It is reserved for billing procedures, for legal interceptions, for enabling the caller to mask the caller's number, etc.

Because a non-certified identifier is displayed on the terminal of the called user, certain ill-intentioned callers do not hesitate to usurp the identities of call centers and to pass themselves off as agents of those call centers. A frequently-encountered situation is as follows: a "fake" agent calls a user, e.g. while pretending to be an agent of the user's bank and putting the number of that bank in the non-certified identifier of the call signaling (e.g. in the SIP FROM field). The called client then sees the client's own bank number displayed and is thus made to feel confident, and might give away sensitive information to the fake agent.

Similar situations can also affect the clients of telecommunications operators who can have their client accounts usurped.

In the face of the multitude of communications channels now in use by call centers (fixed or mobile telephone, short message service (SMS) type messages, instantaneous or electronic messaging, etc.), and in the face of the multiple potential usurpers, these situations are becoming and more frequent. There thus exists a need for reliable technical means in compliance with the regulations that are in force to enable called users to be sure of the identity of the parties calling them when they receive calls from numbers associated with their call centers, so as to enable them to filter malicious calls.

OBJECT AND SUMMARY OF THE INVENTION

The invention satisfies this need in particular by proposing a solution that consists in enriching the signaling of a communication between a calling user and a called user with new information that is inserted by the network of the calling user, that cannot be falsified by third parties outside the calling network and the called network, and that, once it has been inserted, is conveyed in transparent manner, to the network of the called user, in order to be presented to the called user on the equipment on which the called user receives the communication. This "certification" information is advantageously inserted in the signaling of the communication only once the calling network has determined, by using a certified identifier of the first user, that the first user belongs a predetermined category of users (e.g. that it is indeed a call center).

The invention thus relies on two distinct mechanisms that are complementary, being performed by entities (devices) belonging respectively to the network of the calling user and to the network of the called user, the entity of the network of the calling user being configured to verify the identity of the calling user, and where appropriate, to insert the non-falsifiable certification information in the call signaling, while the other entity is configured to make use of this certification information with the called user.

More precisely, in a first aspect relating to the mechanism implemented in the calling network, the invention provides an enrichment method performed by a device of a first telecommunications network for enriching signaling of a communication issued by a first user of the first network and addressed to a second user of a second network, the method comprising:

a verification step during which the device of the first network uses a certified identifier of the first user as determined by the first network to verify whether the first user belongs to a predetermined category of users;

if the first user belongs to said predetermined category of users, an insertion step of the device of the first network inserting "certification" information for the attention of the second user into a signaling field of the communication under the control of the first network, this certification information indicating that the first user belongs to said predetermined category of users; and a transfer step for transferring the signaling of the communication to the second network.

Correspondingly, the invention also provides a device of a first telecommunications network, the device being suitable for enriching signaling of a communication issued by a first user of the first network and addressed to a second user of a second network, the "enrichment" device comprising:

a verification module configured to use a certified identifier of the first user as determined by the first network to verify whether the first user belongs to a predetermined category of users;

an insertion module that is activated if the first user belongs to said predetermined category of users and that is configured to insert "certification" information for the attention of the second user into a field of the signaling of the communication under the control of the first network, the certification information indicating that the first user belongs to said predetermined category of users; and a transfer module configured to transfer the signaling of the communication to the second network.

It should be observed that the first user (i.e. the calling user) and the second user (i.e. the called user) may both belong to the same network, in other words the first network and the second network may be one single network, or on the contrary they may be networks that are distinct, which may be operated by the same operator or by operators that are different.

Furthermore, no limit is associated with the nature of the communication between the first and second users. The communication may be a telephone call of the voice-over-IP (VoIP) type or it may be issued on a network making use of circuit-switching technology, it may be a communication issued in the context of instant messaging or of electronic messaging, it may be an SMS, etc.

The enrichment method (or device) of the invention can easily be configured by appropriately defining the category of users that it is desired to identify and to signal to the called user. Thus, by way of example, if it is desired to identify calls coming from call centers, the verification step of the method of the invention may consist in verifying that the calling user is indeed a call center. This verification is easily performed by the network of the calling user since it is in a position to use a certified identifier of the calling user to determine whether that user does indeed belong to a given category of users. Specifically, this information is already available in the calling network in order to manage its subscribers, or it can be obtained easily.

For this purpose, the verification step may comprise in particular interrogating a database with the certified identifier of the first user.

This database may in particular be a subscriber server of the first network such as a home subscriber server (HSS) that stores all of the profiles of the users subscribing to the first network. The profiles stored in the HSS server may already contain information enabling the first network to determine that the first user belongs to the category of users under consideration, or in a variant it is possible to envisage that when a new user subscribes to the first network, this information is included in that user's profile, where appropriate.

It should be observed that various interfaces are available nowadays for interrogating the HSS server of a network (interfaces based on the Diameter protocol), such that the invention can be performed simply by making use of one of the existing interfaces depending on the device of the first network that is selected to perform the invention. Thus, by way of example, for a first network that relies on an IP multimedia subsystem (IMS) architecture, the enrichment device of the invention may be a serving call session control function (S-CSCF) server that uses a Diameter Cx interface for interrogating the HSS server, or it may be a telephony application server (TAS) using a Diameter Sh interface for dialog with the HSS server.

In a variant, the database consulted by the device of the first network during the verification step may be a database dedicated to a particular category of users, such as a database listing all of the call centers in association with their certified identifiers in the above-described example. In a variant, the database may be interrogated by way of example via a SOAP/http interface, by providing the database with the certified identifier of the first user.

In accordance with the invention, the certification information indicating that the first user belongs to a predetermined category of users is inserted by the first network in a field of the signaling of the communication (i.e. in a header of the message setting up the communication) under the control of the first network: as a result, this information is secure and cannot be falsified by a third party other than the first and second networks. Specifically, the information that the calling user belongs to said predetermined category of users is verified by the first network, i.e. by the network of the calling user, which network is itself considered as being a trusted entity (unlike the calling user). In addition, the certification information cannot be falsified since it is under the control of the first network, i.e. it is inserted by the first network into a particular field of the signaling of the communication that is under the control of the first network and it can be inserted into that field of the signaling only by the first network at the calling end. It is not possible for a third party or the calling user to insert this information into the signaling of the call or to modify it. It should also be observed that the signaling of a communication is transported in a manner that is transparent (i.e. without being modified) between the first network and the second network; in particular, when use is made of transit networks between the first and second networks, the transit networks convey the signaling of the communication from the first network all the way to the second network without modifying it. For the second user, the certification information thus represents user information that is certified and guaranteed. As mentioned above, the certification information is inserted in a field of the signaling of the communication, and in a preferred implementation, in a header of the message setting up the communication. By way of example, when using the SIP protocol, this message is the SIP INVITE message sent by the first user via its terminal in order to initiate (and set up) the communication with the second user. The certification information is included in the header of the SIP INVITE message.

In a particular implementation, the signaling field in which the certification information is inserted by the device of the first network is associated with a signaling parameter under the control of the first network and comprising the certified identifier of the first user.

In SIP protocol, such a parameter may in particular be the P-Asserted-ID parameter that is already used by the first network for inserting a certified identifier of the first user.

The invention can thus easily be performed by merely adding a field to this parameter or using a field that already exists, such as the DISPLAY field associated with the P-Asserted-Id parameter.

The certification information, if any, as inserted by the enrichment device of the first network is consequently additional to the information already present in the signaling of the communication, such as for example the certified identifier of the first user or the first user's non-certified identifier. The invention thus advantageously does not require any modification to the fields that are present in the signaling (e.g. the field containing the certified identifier of the first user and the field containing the first user's non-certified identifier). As a result it has no impact on the client's experience of the second user, i.e. the called user: all of the information normally used by the second network of the called user is specifically still present in the call signaling and can be used in compliance with existing procedures (e.g. displaying the non-certified identifier of the first user). Inserting this certification information in the signaling of the communication ensures that the invention can be operationally deployed quickly and simply.

Furthermore, when the certification information is present in the signaling of a communication, it serves advantageously to enable the second user to have additional information about the origin of the communication, enabling the second user to distinguish more easily and in reliable manner between a legitimate communication (e.g. coming from a call center) and a fraudulent communication. The second user is thus better informed about the identify of the first user making the call.

No limitation is associated with the form or the value of the certification information added by the first network. It may be generic information, i.e. common to all users belonging to the category of users under consideration, and known to the first and second networks. This generic information may in particular be in the form of a symbol, of a specific character string representative of the category of users (e.g. "call center"), or of its certified nature (e.g. "certified call"), etc. Such an alternative is particularly easy to implement and the certification information is easily recognizable by the second network.

It should thus be observed that the certification information may indicate that the first user belongs to the category of users under consideration in various ways, i.e. by its value properly speaking, but also by its presence in a particular or specific (i.e. predetermined) field of the signaling, in particular when its value is less explicit, etc.

In a variant, the certification information inserted by the device of the first network may be specific to the first user. This certification information may in particular reproduce the heading proposed by the first user and inserted by the first user or by an intermediate entity (e.g. PBX) upstream from the first network in the signaling of the communication ("company A after-sales service"). This variant enables the first user to configure the certification information that it desires to be conveyed to the called party.

As mentioned above, the invention relies on two complementary entities: firstly on the device of the first network that enriches the signaling of the communication with non-falsifiable certification information once it has verified the identity of the first user, and more precisely whether the first user belongs to a predetermined category of users, and secondly on the device of the second network that is configured to treat and use this certification information with equipment of the second user when such information is present in the signaling.

Thus, in a second aspect, the invention provides a treatment method for treating signaling of a communication issued by a first user of a first network addressed to a second user of a second network, the treatment method being for implementation by a device of the second network and comprising:

a detection step of detecting "certification" information in a first field of the signaling of the communication under the control of the first network, which information is inserted by a device of the first network for the attention of the second user, this certification information indicating whether the first user belongs to a predetermined category of users;

an insertion step of the device of the second network inserting the certification information in a second field of the signaling of the communication for presentation to the second user; and a transfer step of transferring the signaling of the communication to equipment of the second user.

Correspondingly, the invention also provides a treatment device for treating signaling of a communication issued by a first user of a first network and addressed to a second user of a second network, the treatment device belonging to the second network and comprising:

a detection module configured to detect "certification" information in a first signaling field of the communication under the control of the first network, the certification information being inserted by a device of the first network for the attention of the second user, the certification information indicating that the first user belongs to a predetermined category of users;

an insertion module configured to insert the certification information into a second signaling field of the communication that is to be presented to the second user; and a transfer module configured to transfer the signaling of the communication to equipment of the second user.

The treatment method and device of the invention benefit from the same advantages set out above for the enrichment method and device of the invention.

In a particular implementation, the second field is associated with a signaling parameter containing an identifier of the first user inserted by equipment of the first user.

In other words, in this implementation, the certification information is inserted by the treatment device in a field of a parameter of the signaling that already contains a non-certified identifier of the first user. As a result, it is ensured that implementation of the invention is compatible with existing user equipment and also with certain services made available by telecommunications operators making use of the non-certified identifier of the first user as contained in the signaling of the communication.

By way of example, in the SIP protocol, the second field may be a field such as the DISPLAY field of the FROM parameter. This makes it easy to implement the invention in the context of the SIP protocol, since it relies on fields and parameters that are already defined in SIP signaling. Furthermore, certain above-mentioned services making use of the non-certified identifier of the first user already rely on the content of the DISPLAY field of the FROM parameter, which makes it easy to use the invention together with those services.

Naturally, another dedicated field of the FROM parameter could also be envisaged and introduced for inserting the certification information.

It should also be observed that this implementation makes it possible to group together in the signaling all of the information that is to be displayed on the equipment of the second user, namely the non-certified identifier of the first user and the certification information, which makes it easier to treat this information for the equipment of the second user.

In a particular implementation, the treatment method further comprises a step of obtaining from a database information about the first user, and a step of inserting all or part of the information obtained in the second signaling field together with the certification information.

This implementation has a preferred application in the calling name identification presentation (CNIP) service as is commonly made available by the operators of telecommunications networks to their clients. The CNIP service makes provision not only for presenting the number of the calling user to the called user (e.g. by displaying this number on a terminal of the called user), but also presenting additional information about the first user and in particular a name, an address, etc., this additional information being obtained from a previously-constituted database. Such a database may in particular be a directory database that is interrogated by the second network before forwarding the signaling of the communication to the second user.

Thus, in this implementation, the certification information "virtually" enriches the additional information contained in the CNIP database interrogated by the second network. The second user benefits from a large amount of information about the first user, enabling the second user to filter the communication in the light of full information. Naturally, the information obtained from the CNIP database may be subjected to hierarchical organization or to truncation by the treatment device in order to limit the amount of pertinent information returned to the second user. It should be observed that when the CNIP service is implemented together with the SIP protocol, the DISPLAY field of the FROM parameter is used to convey the information that is to be displayed on the equipment of the called user.

In another implementation, treatment method further comprises a step of the device of the second network deleting the certification information from the first field of the signaling of the communication.

This implementation complies with the common practice of networks in which certified information from the signaling of communications is deleted before that signaling is forwarded to the destination of the communication, with the use of such certified information generally being reserved to networks themselves (e.g. for billing, for performing legal interceptions, etc.), this information generally not being intended for direct use by the equipment of the users to whom communications are addressed.

In a particular implementation, the various steps of the enrichment method and/or of the treatment method are determined by computer program instructions.

Consequently, the invention also provides a computer program on a data medium, the program being suitable for being performed in an enrichment device or more generally in a computer, the program including instructions adapted to performing steps of an enrichment method as described above.

The invention also provides a computer program on a data medium, the program being suitable for being performed in a treatment device or more generally in a computer, the program including instructions adapted to performing steps of a treatment method as described above.

Each of the above-mentioned programs can make use of any programming language, and be in the form of source code, object code, or code intermediate between source code and object code, such as in a partially compiled form, or in any other desirable form.

The invention also provides a computer readable data or recording medium including instructions of a computer program as mentioned above.

The data or recording medium may be any entity or device capable of storing the program. For example, the medium may comprise storage means, such as a read only memory (ROM), e.g. a compact disk (CD) ROM, or a microelectronic circuit ROM, or indeed magnetic recording means, e.g. a floppy disk or a hard disk.

Furthermore, the data or recording medium may be a transmissible medium such as an electrical or optical signal, suitable for being conveyed via an electrical or optical cable, by radio, or by other means. The program of the invention may in particular be downloaded from an Internet type network.

Alternatively, the data or recording medium may be an integrated circuit in which the program is incorporated, the circuit being adapted to execute or to be used in the execution of the method in question.

In a third aspect, the invention also provides a communications system comprising:
- a treatment device for treating signaling of a communication issued by a first user of a first network and addressed to a second user of a second network, the treatment device belonging to the second network and being in accordance with the invention; and
- equipment of the second user to which the signaling of the communication is transferred by the treatment device, said equipment being configured to supply the second user with all or part of the certification information inserted in the signaling of the communication.

In a particular embodiment, the communications system further comprises an enrichment device of the invention belonging to the first network and configured to insert the certification information into the signaling of the communication.

The communications system has the same advantages as mentioned above for the enrichment device and the treatment device of the invention.

In other implementations and embodiments, it is also possible to envisage that the enrichment method, the enrichment device, the treatment method, the treatment device and the system of the invention present all or some of the above-mentioned characteristics in combination.

BRIEF DESCRIPTION OF THE DRAWINGS

Other characteristics and advantages of the present invention appear from the following description made with reference to the accompanying drawings, which show an embodiment having no limiting character. In the figures.

DETAILED DESCRIPTION OF THE INVENTION

Figure 1:
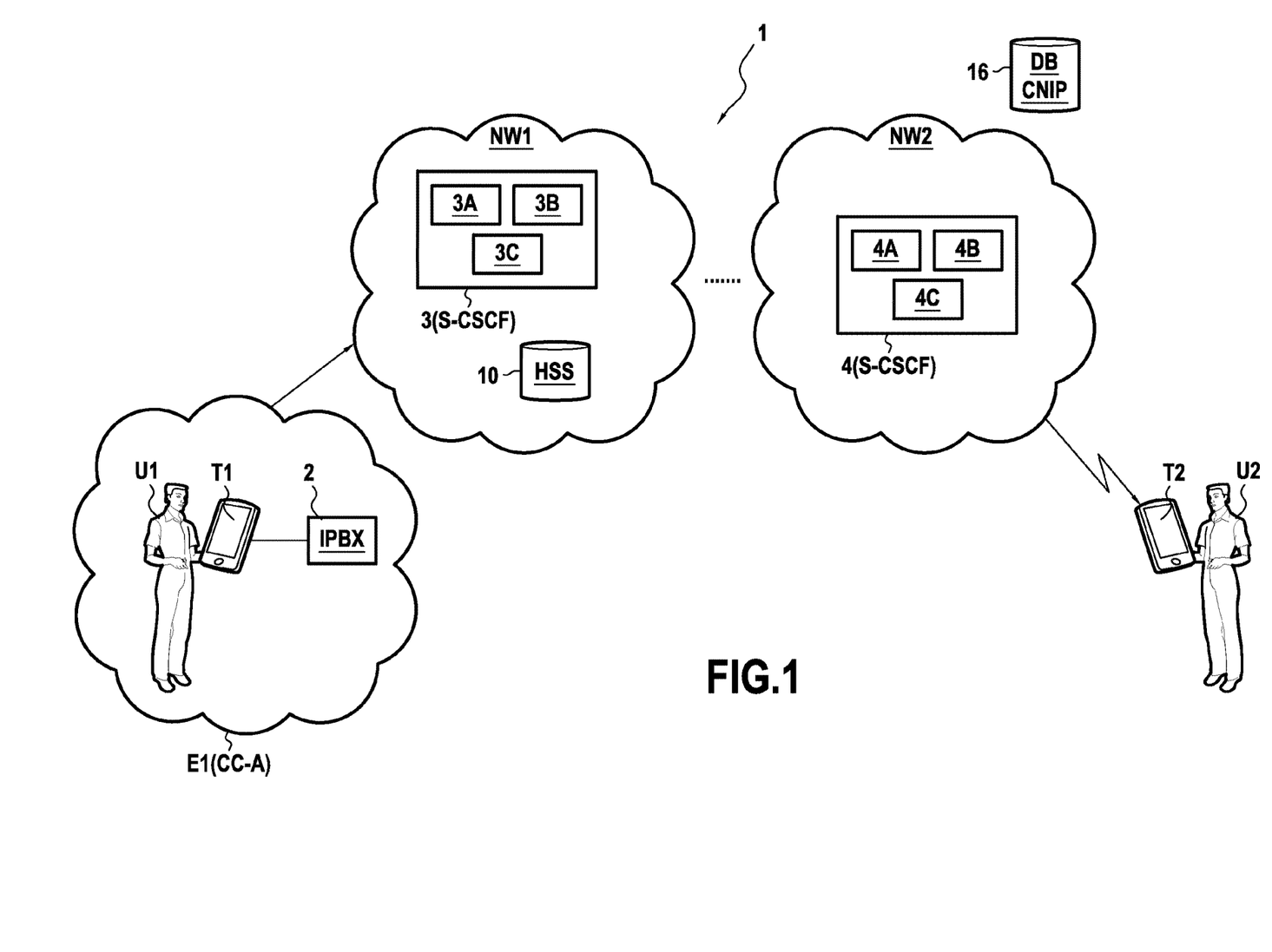
FIG. 1 is a diagram showing a communications system in accordance with the invention, in a particular embodiment.

FIG. 1 shows a particular embodiment of a communications system 1 in accordance with the invention in its environment.

In the example shown in FIG. 1, the communications system 1 is configured to enrich the signaling of a communication issued by a user U1 referred to as the "caller" (or "first" user in the meaning of the invention), by means of a terminal T1, the communication being addressed to a user U2 referred to as the called party (or "second" user in the meaning of the invention), having a terminal T2. In this example, the communication in question is a voice communication (i.e. a call made by the user U1 to the user U2), with both of the terminals T1 and T2 being voice-over-IP (VoIP) telephones.

It is assumed in this example that the user U1 is an agent of a call center CC-A calling the user U2 on behalf of a company A and more particularly on behalf of its after-sales service. Naturally, this example is given solely by way of illustration and the invention applies to other contexts.

The terminal T1 used for this purpose by the user U1 in this example is connected to a private branch exchange 2 that uses the Internet protocol in order to manage telephone calls from the call center. Such an exchange is referred to as an IPBX. The terminal T1 and the IPBX 2 constitute equipment E1 in the meaning of the invention used by the user U1 in order to set up a call with the user U2 on the terminal T2. Likewise, the terminal T2 constitutes equipment in the meaning of the invention used by the user U2 for receiving the call initiated by the user U1.

It should be observed that no limitation is associated with the natures of the pieces of equipment used respectively by the users U1 and U2 in order to set up and participate in the communication. These pieces of equipment may be terminals such as fixed or mobile telephones, computers, digital tablets, connected objects, etc., or any other type of equipment, e.g. such as a server. They may be used in combination with a private branch exchange (PBX, IPBX, etc.) or directly. Furthermore, no limitation is associated with the nature of the communication between the user U1 and the user U2: it may be a telephone call, or a communication set up in the context of instant or electronic messaging, or an SMS type message sent by the user U1 to the user U2, etc. Whatever the nature of the communication involved, the description refers to the user originating the communication as the "calling user" and to the user to whom the communication is addressed as the "called user".

In the particular embodiment presently under consideration, the users U1 and U2 are managed by different networks (i.e. they are registered with or subscribers to different networks), which networks are referred to respectively as NW1 and NW2. In this example, the user U1 acting on behalf of the call center CC-A of the after-sale service of company A is registered via the call center CC-A with the network NW1, in other words it is the call center CC-A that is properly speaking registered with the network NW1. The call center CC-A is thus a user in the meaning of the invention.

In this example, both networks NW1 and NW2 are voice-over-IP networks of IMS architecture relying on the session initiation protocol (SIP). In known manner to the person skilled in the art, a network that implements an IMS architecture has a plurality of functional entities, including in particular:

- a call session control function (CSCF) entity, itself made up of a plurality of servers including in particular a serving call session control function (S-CSCF) server in charge of registering terminals on the network, and a proxy call session control function (P-CSCF) server, which are points of contact for terminals with the network;
- one or more application servers hosting and providing services; and
- a home subscriber server (HSS) that contains the profiles of the users that are registered with the network (including the call center CC-A and the user U2).

The networks NW1 and NW2 may be managed by the same operator or by operators that are different. They can also communicate with each other equally well directly or else via one or more transit networks. When transit networks are present between the networks NW1 and NW2, they convey the SIP signaling of communications transparently between the networks NW1 and NW2 in compliance with the service level agreements (SLAs) that are generally adopted.

In a variant, the users CC-A (and thus U1) and U2 may be registered with and belong to the same network, i.e. NW1=NW2.

Furthermore, although the invention is described herein in an IP environment from end to end relying on IMS network architectures and on the SIP signaling protocol, the invention applies in other contexts, including when circuit-switched type technologies are implemented by the networks NW1 and NW2, e.g. in association with the ISDN signaling user part (ISUP) or the bearer independent call control (BICC) signaling protocol.

In the embodiment shown in FIG. 1, the communications system 1 comprises, in addition to the terminal T2 of the user U2:

- a device 3 belonging to the network NW1 and suitable for enriching the communication signaling initiated by users of the network NW1 (e.g. by the call center CC-A by means of its agent U1) addressed to users of the network NW2 (e.g. U2) in accordance with the invention (which device is said to be an "enrichment" device in accordance with the invention). In the example shown in FIG. 1, the device 3 is an S-CSCF server of the network NW1. In a variant, it could be an application server of the network NW1, or indeed a P-CSCF server of the network NW1; and
- a device 4 belonging to the network NW2, and suitable for treating the signaling of calls initiated by users of the network NW1 (e.g. by the call center CC-A) and addressed to users of the network NW2, the signaling being enriched in accordance with the invention (in particular by the device 3). The device 4 is a "treatment" device in accordance with the invention. In the example shown in FIG. 1, the device 4 is an S-CSCF server of the network NW2. In a variant, it could be an application server of the network NW2.

Figure 2:
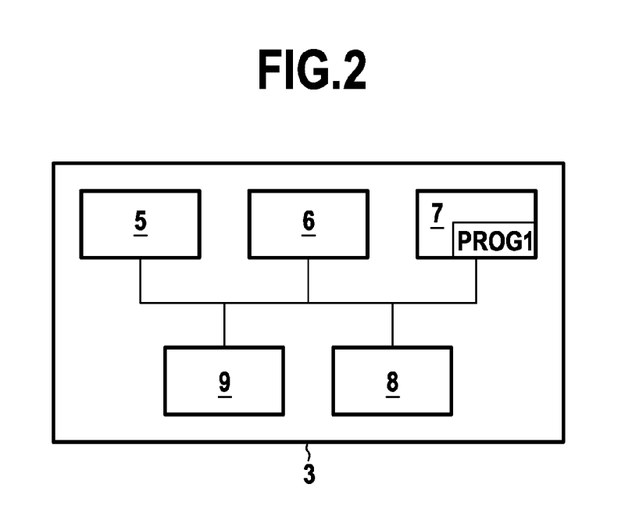
FIGS. 2 and 3 show respectively the hardware architecture of an enrichment device and of a treatment device in accordance with the invention and forming part of the FIG. 1 communications system in a particular embodiment.
Figure 3:
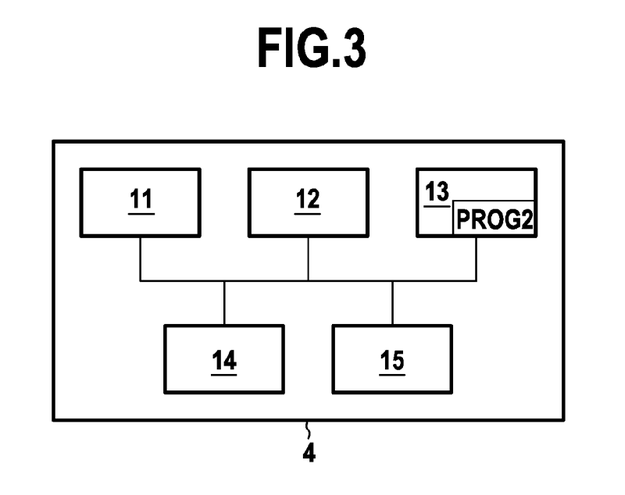

In the presently-described embodiment, the enrichment and treatment devices 3 and 4 of the communications system have the hardware architecture of computers.

More precisely, with reference to FIG. 2, the enrichment device 3 or S-CSCF server 3 comprises a processor 5, a random access memory (RAM) 6, a ROM 7, a non-volatile flash memory 8, and communications means 9 enabling it to communicate over the network NW1 and implementing the SIP protocol. In this example, the communications means 9 of the enrichment device also implements the Diameter protocol enabling it to communicate via a Diameter Cx interface with a subscriber server (HSS) 10 of the network NW1 in order to access the profiles of subscribers.

The subscriber server 10 includes in particular an entry that corresponds to the call center CC-A of the company A, in which there are registered one or more public identities (or in equivalent manner, identifiers) known as IP multimedia public identities (IMPUs) that are associated with the call center and more particularly with its IPBX 2. By way of example, these identities may have an SIP URI format or a TEL URI format, and they are supplied to the IPBX 2 in the P_Associated_URI field of a 200 OK REGISTER message by the network NW1 when registering the IPBX 2 with the network NW1 (registration performed by the IPBX 2 sending a SIP REGISTER request). They are under the control of the operator of the network NW1 and they are therefore certified by that operator. It is assumed herein that the entry associated with the IPBX 2 further includes an indicator that it constitutes equipment of a call center. No limitation is associated with the form of this indicator (symbol, character strings, etc.). By way of example, this indication may have been supplied to the HSS server 10 when the company A took out a subscription with the operator of the network NW1 for its call center CC-A.

The ROM 7 of the enrichment device 3 constitutes a data medium in accordance with the invention that is readable by the processor 5 and that has stored therein a computer program PROG1 in accordance with the invention that includes instructions for executing steps of a method in accordance with the invention as described below for enriching communication signaling.

The computer program PROG1 defines functional and software modules configured to perform the steps of the enrichment method of the invention. These functional modules rely on or control the above-mentioned hardware elements 5-9 of the enrichment device 3. In this example, and as shown in FIG. 1, they comprise in particular:
- a verification module 3A that is configured, on receiving a communication initiated by a user of the network NW1 (calling user), to verify whether the user belongs to a predetermined category of users by making use of a certified identity of the user as determined by the network NW1. In the presently-envisaged illustrative example, the verification module 3A is configured to verify whether the calling user is a call center. Naturally, depending on the application context of the invention, other user categories could be envisaged;
- an insertion module 3B that is activated if (and in this example only if) the user belongs to said predetermined category of users, and that is configured to insert "certification" information for the attention of the destination user of the communication in a signaling field of the communication controlled by the network NW1; and
- a transfer module 3C configured to transfer the signaling of the communication to the network NW2.

The functions of these various modules are described in greater detail below.

In similar manner, with reference to FIG. 3, the treatment device 4 (i.e. the S-CSCF 4) comprises a processor 11, a RAM 12, a ROM 13, a non-volatile flash memory 14, and communications means 15 enabling it to communicate over the network NW2 and implementing the SIP protocol. These communications means 15 also enable it to communicate with external databases, such as for example a database 16 containing information about a plurality of users extracted from the universal directory.

The ROM 13 of the treatment device 4 constitutes a data medium in accordance with the invention that is readable by the processor 11 and that stores a computer program PROG2 in accordance with the invention, including instructions for executing steps of a treatment method in accordance with the invention as described below for treating communication signaling.

The computer program PROG2 defines functional and software modules configured to perform steps of the treatment method of the invention. These functional modules rely on or control the above-mentioned hardware elements 11-15 of the treatment device 4. In particular, in this example and as shown in FIG. 1, they comprise:
- a detection module 4A configured, on receiving a communication initiated by a user of the network NW1 and addressed to a user of the network NW2, to detect certification information inserted by the network NW1 for the attention of the destination user of the communication (the called user) in a signaling field of the communication controlled by the network NW1;
- an insertion module 4B configured to insert the certification information in another signaling field of the communication that is to be presented to the second user; and
- a transfer module 4C configured to transfer the communication signaling to equipment of the destination user of the cal.

The functions of these various modules are described in greater detail below.

Figure 4:
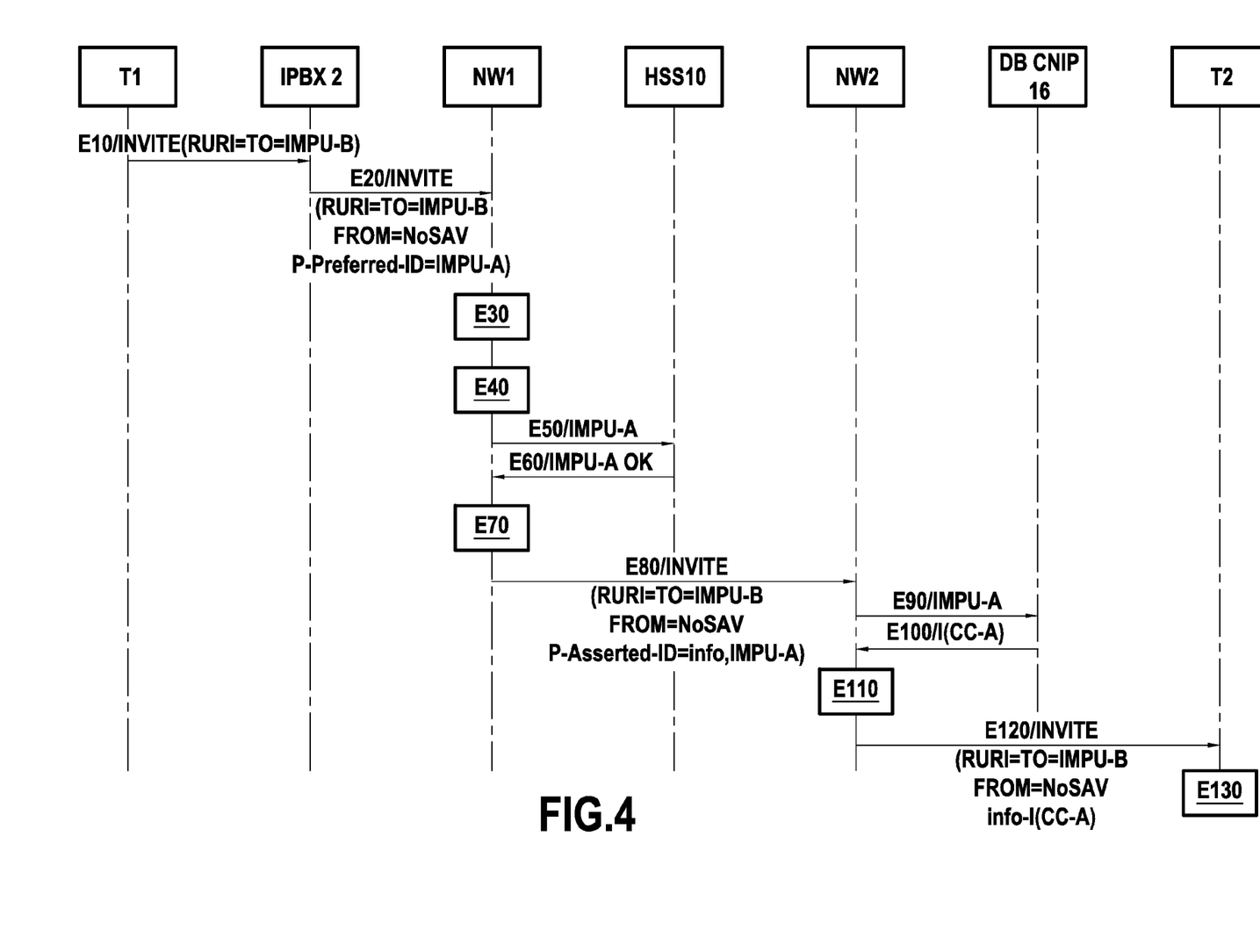
FIG. 4 shows the principal steps of an enrichment method and a method for enriching and treating communication signaling in accordance with the invention in a particular implementation making use respectively of the enrichment device and of the treatment device of the FIG. 1 communications system.

With reference to FIG. 4, there follows a description of the main steps of a method of enriching communication signaling as they are performed by the enrichment device 3 (S-CSCF 3) of the network NW1, and the main steps of a method of treating the signaling as they are performed by the treatment device 4 (S-CSCF 4) of the network NW2, in a particular implementation.

In order to illustrate these steps, consideration is given below to a communication (and more precisely in this example a telephone call) initiated via the equipment E1 (terminal T1 placed behind the IPBX 2) by the user U1 in the name of the call center CC-A of the company A and addressed to the user U2. As mentioned above, on being registered with the network NW1, the IPBX 2 receives a list of public identities that are registered for the call center CC-A of the company A with the HSS server 10.

More precisely, the terminal T1 of the user U1 issues an SIP INVITE message addressed to an identifier of the user U2 (step E10). The SIP INVITE message sent by the terminal T1 to an identifier of the user U2 is, in known manner, a message for initiating a communication with the user U2. In this example, the identifier of the user U2 is a public identity (IMPU) written IMPU_B. By way of example, it may be stored in the IPBX 2 or in a database of the call center. The identifier IMPU_B is included in the call signaling (in other words in a header of the SIP INVITE message), in the Request URI and TO headers of the SIP INVITE message. It should be observed that in known manner the various items of information placed in the headers of the SIP INVITE message form part of or indeed constitute the call signaling.

The SIP INVITE message passes via the IPBX 2. On receiving the SIP INVITE message, the IPBX 2 puts the calling public identity that it desires to use for this call into the signaling of the message. For this purpose, it selects one of the certified public identities that it receives during registration with the network NW1. This identity is written herein IMPU_A. The IPBX 2 puts the value IMPU_A as the parameter P_Preferred_Id in the signaling of the SIP INVITE message.

Furthermore, in the FROM parameter of the SIP INVITE message it specifies the number of the call center CC-A where it can be reached by the user U2, in particular in compliance with the legislation in force in France. This number is written NoSAV, e.g. NoSAV=0800103900. This number is an identifier that is not certified in the meaning of the invention for the call center CC-A and correspondingly for the user U1.

Thereafter, the SIP INVITE message and its associated signaling, including in particular the parameters Request URI, TO, FROM, P_Preferred_ID as completed in this way, are transferred to the network NW1 (E20).

The SIP INVITE message is received by the P-CSCF server of the network NW1. On receiving this message, the P-CSCF server analyses the associated signaling (step E30).

More precisely, it verifies whether an identity is contained in the P_Preferred_ID parameter.

Where appropriate (as in the presently-described example), it verifies whether this identity (i.e. IMPU-A) is one of the IMPU identities saved in the HSS server 10 for the call center CC-A and supplied to the IPBX 2 during its registration.

If this is so, the P-CSCF server adds a P-Asserted-ID parameter in the heading (signaling) of the SIP INVITE message containing this identity. In other words, in this example, the P-CSCF server adds a P-Asserted-ID parameter containing the identity IMPU-A of the call center CC-A. It should be observed that the P-Asserted-ID parameter is under the control of the network NW1 (i.e. it cannot be modified by a third party outside (i.e. different from) the network NW1 or the network NW2) such as a user of the network NW1, or by an intermediate network between the networks NW1 and NW2 via which the SIP INVITE message passes in transit and it contains an identity that is certified by the network NW1. This parameter is known in the SIP protocol and in particular it is described in greater detail in the document RFC 3325 published by the Internet engineering task force (IETF).

If no P_Preferred_ID parameter is present in the signaling of the SIP INVITE message, or if its content is not present in the list of identities associated with the call center and with its IPBX 2, the P-CSCF server itself adds a public identity IMPU that is associated with the call center CC-A by the HSS server 10 into the P-Asserted-ID parameter. The public identity IMPU that is added is the default public identity of the call center CC-A, i.e. the first public identity that is present in the P-Associated-URI parameter of the 200 OK REGISTER message previously returned to the IPBX 2.

The P-CSCF server also deletes the P-Preferred-ID parameter from the header of the SIP message (and thus from the signaling) if it is present.

The SIP INVITE message is then transferred to the S-CSCF server of the network NW1 in charge of the call center CC-A (step E40). In the presently-described example, this is the S-CSCF server 3 in accordance with the invention.

In addition to the conventional processing performed by an S-CSCF server and not described herein, the S-CSCF server 3 performs treatment in accordance with the invention by means of its verification module 3A to verify whether the user originating the communication belongs to a predetermined category of users. In the presently-envisaged example, the certification module 3A verifies whether the user originating the communication is a call center (in other words, the predetermined category of users in question in this example is the category of call centers).

For this purpose, in the presently-described implementation, the verification module 3A uses the certified identity IMPU_A of the call center present in the signaling of the INVITE message in the P-Asserted-ID parameter. More precisely, it interrogates the HSS server 10 with this certified identity IMPU_A via the Diameter Cx interface implemented by the communications means 9 of the S-CSCF server 3 (step E50) in order to determine whether the user associated with this identity is a call center.

On receiving the request from the S-CSCF server 3, the HSS server 10 consults the profile of the user associated with the certified identity IMPU_A, i.e. the call center CC-A, and in that profile it detects an indicator specifying that the user CC-A belongs to the category of call centers.

The HSS server 10 thus gives a positive response to the interrogation from the S-CSCF server 3 telling it that the user associated with the certified identity IMPU_A does indeed belong to the category of call centers (step E60).

In a variant, in order to verify whether the user associated with the identity IMPU_A is a call center, the verification module 3A can interrogate a dedicated database listing call centers in association with their certified identities. In this variant, and by way of example, it is possible to envisage that communications means 9 of the S-CSCF server 3 use the SOAP and http protocols for communicating with the database. The communications interface between the S-CSCF server 3 and the database may then consist in the S-CSCF server 3 providing the certified identity IMPU_A as an input to the database, and in receiving from the database in response the certified identity on its own if it does not correspond to a call center, or the certified identity accompanied by an indicator of belonging to the call center category if the certified identity IMPU_A corresponds to a call center.

On receiving from the HSS server 10 the indication that the user CC-A belongs to the call center category, the S-CSCF server 3 acts via its insertion module 3B to insert so-called certification information written "info" into the signaling of the SIP INVITE message for the attention of the destination user U2 of the message (step E70). This certification information "info" indicates that the user calling the user U2 (in other words the call center CC-A acting via its agent U1) belongs to the category of call centers.

No limitation is associated with the form to be taken by the certification information "info".

Thus, by way of example, the certification information "info" may be unique and generic for all call centers (and may be the subject of standardization specifically for this purpose). It may then consist in a code or a symbol, or indeed in a predetermined character string (e.g. "call center", "certified", etc.).

In a variant, the certification information "info" may be specific, i.e. specific to each call center. It may in particular take as its value the name of the call center in question, i.e. CC-A in the presently-described example, or the name of the company for which the call center is operating. It is then possible to envisage that the value of the certification information is supplied dynamically by the call center in the signaling of the SIP INVITE message, e.g. in a DISPLAY field of the FROM parameter. Such a field is itself already known for the FROM parameter as defined by the IETF standard RFC 3261.

In a variant, this value may be present in the profile of the user CC-A as stored in the HSS server 10, and it may have been included in the profile during subscription of the call center.

In the presently-described implementation, the S-CSCF server 3 inserts the certification information "info" into a field of the P-Asserted-ID parameter that is controlled by the network NW1, e.g. in a DISPLAY field of the P-Asserted-ID parameter. The P-Asserted-ID parameter thus contains both the certified identifier IMPU_A of the call center CC-A, and also the certification information "info" when CC-A is indeed a call center.

It should be observed that in the presently-described implementation, the certification information "info" is inserted in the signaling of the SIP INVITE message only when the S-CSCF server 3 has determined that the user associated with the certified identity IMPU_A is a call center. Thus, even though this certification information may for example be the name "CC-A" of the call center, it is inserted into the field of the P-Asserted-ID parameter only if it has been verified by the S-CSCF server 3 that the user CC-A is a call center.

Thus, in the presently-described implementation, the certification information "info" is inserted in a predetermined (i.e. specific) field of the signaling, namely a field of the P-Asserted-ID parameter. In a variant, the S-CSCF server 3 may insert the certification information "info" in some other field of the signaling of the SIP INVITE message. For this purpose, it is possible to envisage creating and standardizing a new header, which is under the control of the network NW1 in addition to the already-existing headers as defined by the SIP protocol, such as for example a "CALLER-AUTHENTICATION" header that could take the value "TRUE" if the user is identified by the S-CSCF server 3 as being a call center, and otherwise the value "FALSE". This new header should be defined in such a manner that it is controlled by the network of the caller (i.e. NW1) like the P-Asserted-ID parameter so as to preserve the certified nature of the certification information. It could be a specific header dedicated to transporting certification information, if any.

By means of its transfer module 3C and its communications means 9, the S-CSCF server 3 then transfers the SIP INVITE message containing signaling that has been enriched with the certification information "info" to the network NW2 for the user U2 in known manner (step E80). While being routed to the network NW2, the signaling of the SIP INVITE message is transferred in transparent manner, i.e. the contents of its headers, and in particular of its FROM and P-Asserted-ID headers are not modified during such routing until it reaches the network NW2.

It should be observed that in the presently-described implementation, the device at the origin of the signaling of the SIP INVITE message being enriched with the certification information "info" is the S-CSCF server 3. As mentioned above, in another implementation, the signaling may be enriched in accordance with the invention by some other device of the network NW1 that is suitable for interrogating the HSS server 10 or a database dedicated to call centers. In particular, it may be an application server (dedicated or not dedicated), that is used for this purpose by the S-CSCF server, for example. The HSS server 10 may be interrogated by such an application server using the Diameter protocol, and in particular the already-known Sh interface.

When the SIP INVITE message reaches the network NW2, it is received by the interrogating-call state control function (I-CSCF) server of the network NW2 which transfers it to the S-CSCF server 4 in charge of the user U2 to whom the message is addressed.

In the presently-envisaged example, it is assumed that the user U2 has subscribed to the CNIP service with the operator of the network NW2. In known manner, this service is available in France on fixed networks and in particular on voice-over-IP networks. This service operates as follows: when the called user has subscribed to the CNIP service, each incoming call triggers a telephony application server TAS. This server sends a SOAP/http request for the user who has subscribed to the CNIP service to a CNIP database (database 16 in FIG. 1) that contains the information present in the universal directory. Nevertheless, this CNIP database does not contain any information about "unlisted" clients nor about businesses, etc. In general, it does not contain any information about call centers. In accordance with the CNIP service, the information as obtained in this way is for presenting to the user U2 in association with the number of the calling user.

It should be observed that implementing the CNIP service may require explicit activation on the telephone installation of the user U2, e.g. via a home gateway of the installation if it has one or on the terminal T2 itself. This activation is performed in known manner by activating an indicator provided for this purpose in the configuration file of the home gateway so as to inform it that it is to make use of the contents of certain fields in the call signaling that contain the information obtained from the CNIP database.

In the presently-described implementation, on receiving the SIP INVITE message, the S-CSCF server 4 uses its detection module 4A to analyze the signaling of the SIP INVITE message and it extracts the certified identifier IMPU_A from the P-Asserted-ID parameter.

Using this identifier it determines whether the user U2 is a subscriber to the CNIP service.

Where applicable (as in the present example), the S-CSCF server 4 then uses a telephone application server for this purpose to interrogate the CNIP database 16 (step E90). This interrogation is performed by sending the certified identity IMPU_A as extracted from the P-Asserted-ID parameter of the signaling of the SIP INVITE message to the CNIP database 16.

In response to this interrogation, the CNIP database 16 sends the information that it contains, if any, about the user associated with the certified identity IMPU-A (step E100). If the CNIP database 16 does not contain any information about call centers, it returns an empty response to the S-CSCF server 4. In this example, it is assumed that the CNIP database 16 does contain information I(CC-A) about the call center CC-A associated with the identity IMPU_A, and that it sends this information in its response to the S-CSCF server 4. By way of example, this information contains the name of the company A, the address of the after-sales service of the company A for which the call center CC-A is operating, etc.

During its analysis of the signaling of the SIP INVITE message, the detection module 4A of the S-CSCF server 4 also detects the presence of the certification information "info" inserted in the P-Asserted-ID field and indicating that the user originating the SIP INVITE message belongs to the call center category (step E110).

In accordance with the invention, this certification information is to be presented to the user U2. For this purpose, in the presently-described embodiment, the S-CSCF server 4 acts via its insertion module 4B to extract the certification information "info" from the P-Asserted-ID parameter and inserts it in a field of the SIP INVITE message that is to be presented to the user U2.

By way of example, such a field is the DISPLAY field of the FROM parameter of the SIP INVITE message. The advantage of using this already-existing field in the SIP signaling in order to transfer the certification information "info" to the called user is that this is compatible with all called SIP terminals. Specifically, the content of the DISPLAY field of the FROM parameter is already displayed on the terminal of the called user together with the number of the calling user (contained in the FROM field), up to a maximum of 50 characters in the context of the calling name identification presentation (CNIP) service. The CNIP service is also equally available for fixed or mobile (2G/3G) circuit-switched networks and for packet-switched networks, and in particular for fixed VoIP and mobile (4G/LTE, VoWiFi) networks.

It should be observed that the DISPLAY field of the FROM parameter does not, a priori, contain any information before the certification information is inserted therein by the S-CSCF server 4. Specifically, it is known that in accordance with the SIP protocol when the SIP INVITE message reaches the network NW2, the content of the DISPLAY field of the FROM parameter is always deleted so as to avoid interfering with name identification presentation services, which rely on the content of the FROM parameter, and to which the user U2 might have subscribed with the network NW2.

In addition to the certification information, the S-CSCF server 4 also inserts into the DISPLAY field some or all of the information I(CC-A) as received from the CNIP database 15. Preferably, the certification information "info" and the information I(CC-A) is concatenated in the DISPLAY field of the FROM parameter in such a manner that the certification information is displayed first on the screen of the terminal T2 of the user U2, which is important for enabling the user U2 to filter calls.

Furthermore, since the size of the content of the DISPLAY field is limited to 50 characters, it may be necessary for the insertion module 4B to select what information is to be inserted in this field. Thus, the insertion module 4B may decide to include only the certification information "info" in the DISPLAY field (without the information I(CC-A)).

In a variant, it may decide to include only the information I(CC-A) as received from the CNIP database 15.

In yet another variant, the insertion module 4B may decide to truncate the information I(CC-A) before concatenating it with the certification information "info" in the DISPLAY field of the FROM parameter of the SIP INVITE message.

In another implementation, the certification information "info" may be inserted by the insertion module 4B in another field of the signaling of the SIP message that is to be presented to the user U2 on the terminal T2.

Naturally, if the CNIP database 15 does not contain and does not return any information about the call center CC-A, or if the user U2 has not subscribed to the CNIP service, only the certification information is inserted by the S-CSCF server 4 into the DISPLAY field of the FROM parameter.

In the presently-described implementation, after putting the certification information "info" into the DISPLAY field of the FROM parameter, the S-CSCF server 4 deletes the P-Asserted-ID parameter containing the certified identifier of the call center CC-A and the certification information "info" as inserted by the network NW1 from the signaling of the SIP INVITE message. It should be observed that this step is nevertheless optional, it being possible for the S-CSCF server 4 to leave the P-Asserted-ID parameter intact in the signaling of the SIP INVITE message.

Thereafter, the S-CSCF server 4 uses its transfer module 4C and its communications means 15 to transfer the SIP INVITE message and the associated signaling to the terminal T2 of the user U2 (step E120).

On receiving the SIP INVITE message, the content of the FROM parameter is displayed on the screen of the terminal T2 of the user U2 in compliance with procedures already existing in the prior art (E130). This content comprises firstly the non-certified identifier NoSAV contained in the FROM parameter and placed in this field by the equipment E1 of the call center CC-A and secondly the information contained in the DISPLAY field of the FROM parameter, including in particular the certification information "info". The user U2 of the terminal T2 is thus informed that the call received from the user U1 does indeed come from a call center.

In the presently-described implementation, both the treatment of the signaling of the SIP INVITE message that, in accordance with the invention, consists in making use of the certification information introduced into the signaling by the network NW1 and also the forwarding of the information to the user U2 in accordance with the invention are performed by the S-CSCF server 4. Nevertheless, this assumption is not limiting, and the treatment method of the invention may be performed by some other device of the network NW2, such as for example by a telephone application server of the network NW2.

In the presently-envisaged example, the networks NW1 and NW2 are voice-over-IP networks making use of the SIP protocol. Nevertheless, and as mentioned above, the invention applies in other contexts, and in particular with signaling protocols other than the SIP protocol. In particular, the invention may be applied when the signaling in consideration complies with the ISUP/BICC protocol, with the generic number or additional calling party number (ACgPN) and the calling number or calling party number (CgPN) performing roles identical to the SIP FROM and P-Asserted-ID fields, respectively.

The invention claimed is:

1. A method implemented by a device of a first telecommunications network for enriching a signaling of a communication issued by a first user of the first network and addressed to a second user of a second network, the method comprising:
    using a certified identifier of the first user as determined by the first network to verify whether the first user belongs to a given category of users;
    upon a determination that the first user belongs to the given category of users, inserting certification information for the attention of the second user into a signaling field of the signaling of the communication, the signaling field under control of the first network, the certification information indicating that the first user belongs to the given category of users; and
    transferring the signaling of the communication to the second network.

2. The method of claim 1, wherein using a certified identifier of the first user as determined by the first network to verify whether the first user belongs to the given category of users comprises interrogating a database with the certified identifier of the first user.

3. The method of claim 2, further comprising interrogating the database via a SOAP/http interface.

4. The method of claim 2, wherein the database is a subscriber server of the first network.

5. The method of claim 1, wherein the signaling field is associated with a signaling parameter under the control of the first network including the certified identifier of the first user.

6. The method of claim 1, wherein the certification information inserted by the device of the first network is specific to the first user.

7. A computer having stored thereon instructions which when executed by the computer, cause the computer to implement the method of claim 1.

8. A non-transitory computer readable data medium having stored thereon instructions, which when executed by a processor, cause the processor to implement the method of claim 1.

9. A device of a first telecommunications network, the device configured to enrich a signaling of a communication issued by a first user of the first network and addressed to a second user of a second network, the device configured to:

use a certified identifier of the first user as determined by the first network to verify whether the first user belongs to a given category of users;

upon determining that the first user belongs to the given category of users, insert certification information for the attention of the second user into a signaling field of the signaling of the communication, the signaling field under control of the first network, the certification information indicating that the first user belongs to the given category of users; and transfer the signaling of the communication to the second network.

10. The device of claim 9, wherein the device is configured to interrogate a database with the certified identifier of the first user to verify whether the first user belongs to the given category of users.

11. The device of claim 10, wherein the device is configured to use a SOAP/http interface to interrogate the database.

12. The device of claim 10, wherein the database is a subscriber server of the first network.

13. The device of claim 9, wherein the signaling field is associated with a signaling parameter under the control of the first network including the certified identifier of the first user.

14. The device of claim 9, wherein the certification information inserted by the device of the first network is specific to the first user.

* * * * *